W. H. GROTE.
PROCESS OF SPLICING THE ENDS OF RUBBER TUBES.
APPLICATION FILED APR. 25, 1921.
1,402,492.
Patented Jan. 3, 1922.
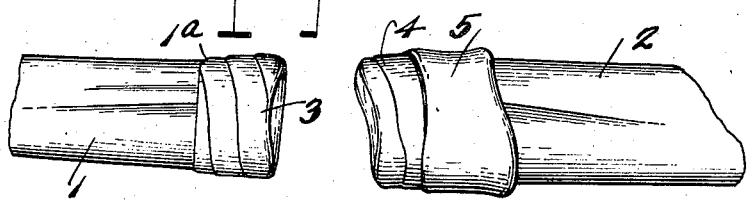
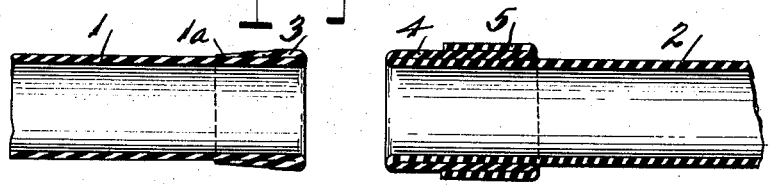
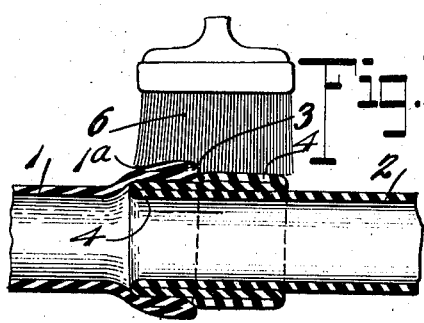
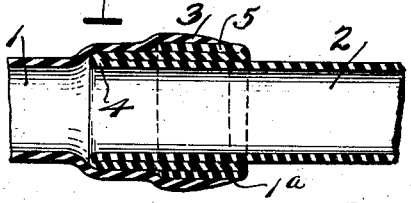
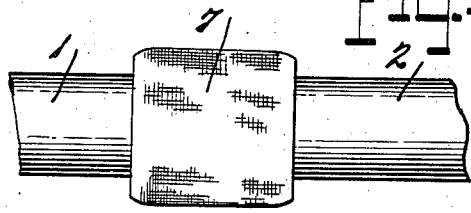
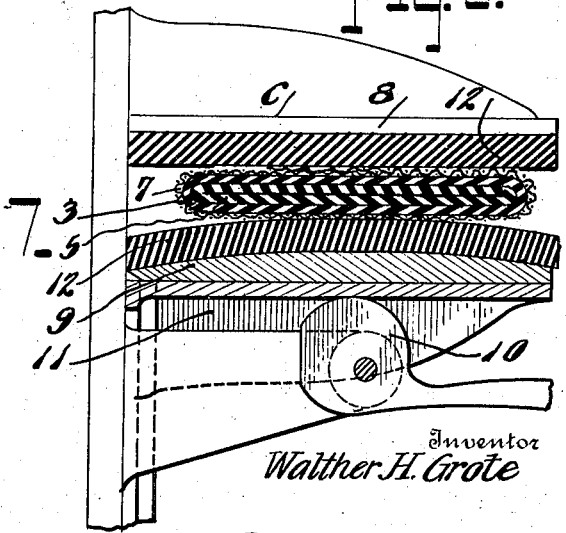
Inventor
Walther H. Grote

UNITED STATES PATENT OFFICE.

WALTHER H. GROTE, OF LOUISVILLE, KENTUCKY, ASSIGNOR TO ASSOCIATED HOLDINGS CORPORATION, OF NEW YORK, N. Y., A CORPORATION OF DELAWARE.

PROCESS OF SPLICING THE ENDS OF RUBBER TUBES.

1,402,492.

Specification of Letters Patent.  Patented Jan. 3, 1922.

Application filed April 25, 1921. Serial No. 464,088.

*To all whom it may concern:*

Be it known that I, WALTHER H. GROTE, a citizen of the United States, residing at Louisville, in the county of Jefferson and State of Kentucky, have invented certain new and useful Improvements in Processes of Splicing the Ends of Rubber Tubes, of which the following is a specification.

In the manufacture of inflatable inner tubes for automobile tires it is customary to first provide a tube of the proper length and to then splice or fasten the ends of the tube together. Ordinarily the rubber tube is vulcanized by the heat process before the ends are brought together, and the ends cemented together or treated with cement and a sulphur chloride solution to cause them to adhere properly to each other.

According to the old method of splicing the ends of a rubber tube, these ends are placed upon mandrels and separately treated, each being coated with cement and the sulphur chloride solution. Ordinarily three coats of cement are applied, and each coat of cement must be permitted to dry before the next coat is applied. After the ends of the tube have thus been properly treated the two mandrels are brought together and the relative portions of the joints blown over each other by air pressure or drawn over by hand, depending upon the particular construction of the mandrels employed. One of the mandrels is then removed from the tube and the lap joint on the other mandrel wrapped with a rubber band to produce pressure thereon, in which condition it is left for about twenty minutes, after which the rubber band is taken off and the mandrel removed.

This old method of splicing requires some seven or eight distinct operations and takes a considerable amount of time, besides being otherwise unsatisfactory, inasmuch as the mandrels get dirty and the rubber has a tendency to adhere thereto, thereby producing crooked splices and not infrequently tearing the tubes.

The object of the present invention has been to provide an improved process which will eliminate a number of these operations, thereby saving time, and which also avoids the use of mandrels. Not only does the new process of this invention result in a great saving of time and material, but more perfect joints are produced and there is a greater uniformity in the output.

For a full understanding of my improved process of splicing the ends of inner tubes and the various steps incident to carrying out the process, reference is to be had to the following description and accompanying drawings, in which:—

Figure 1 is a perspective view of the two ends of an inner tube, showing the manner of folding the same preparatory to bringing them together;

Figure 2 is a sectional view through the same;

Figure 3 is a sectional view through the ends of the tube after they have been brought together, showing the manner of applying the cement and sulphur chloride solution thereto;

Figure 4 is a sectional view showing the ends of the tube brought into an overlapping relation after having been treated in the manner indicated by Fig. 3;

Figure 5 is a plan view showing the folded and overlapped ends as wrapped with fabric;

Figure 6 shows the wrapped and overlapped ends as placed in a clamp and subjected to pressure while wrapped with the fabric; and Figure 7 is a sectional view through the spliced ends of the tube after it has been removed from the clamp, the fabric wrapping removed and the folds drawn out.

Corresponding and like parts are referred to in the following description and indicated in all of the views of the drawing by like reference characters. In carrying out the process of splicing the ends of a rubber tube, the two ends 1 and 2 are preliminarily folded in the manner indicated by Figs. 1 and 2. The end 1 has the skived or featheredged portion $1^a$ thereof folded back at 3. The end 2 of the tube is folded back at 4 and the edge thereof re-turned at 5. The end 1 is then telescoped upon the neck portion provided by the folded portion 4 of the end 2 and the folded over portion 3 of the end 1 brought substantially into engagement with the re-turned edge portion 5 of the tube 2, as indicated by Fig. 3.

While in this position the two portions of the tube to be spliced can be simultaneously treated with the rubber cement and then with the sulphur chloride solution, by means of some member such as a brush 6. It has been found that one good coat of rubber cement is sufficient to produce a perfect joint, and in this respect there is a material saving in time and material over the old process which required the application of two or three coats of rubber cement, each coat to be perfectly dried before the next coat is applied. The sulphur chloride solution is applied in the same manner as the rubber cement, and the folded over portion 3 of the end 1 is then immediately drawn over the re-turned edge 5 of the end 2, as indicated by Fig. 4. A wrapping of fabric or other flexible inelastic material 7 is next applied to the folded and overlapping portions of the tube ends, as indicated by Fig. 5, after which the wrapped portion of the tube is placed in a clamp C.

The clamp may be of any suitable construction, and in the present instance it is shown as including a fixed jaw 8 and a movable jaw 9 which is adapted to be actuated by a cam lever 10 pivoted upon an arm 11. The faces of the jaws are provided with some cushion material such as sponge rubber 12, and the face of the movable jaw is slightly convex to avoid any possibility of pinching the tube. This clamp takes the place of the rubber band which, according to the old process, was applied to the overlapped ends to produce pressure thereon during the splicing process. It has been found that the success of the splicing operation depends very largely upon the pressure applied, and according to this process an absolutely uniform pressure is exerted upon each and every tube, whereas by the old method each rubber band is of a different strength and each operator wraps the rubber bands differently. Not only is greater uniformity and a better splice produced by the present process, but it has been found that it is only necessary for the splice to remain under pressure for a period of two minutes instead of for a period of twenty minutes, as has heretofore been required. This saving in time is a factor of great importance when the constantly increasing cost of labor and overhead expenses are considered.

The jaws of the clamp C are sufficiently wide to receive any standard size of tube, and the function of the inelastic fabric wrapper 7 is to confine the lateral spreading or squeezing out of the rubber when subjected to the pressure of the clamp. In other words, the elastic nature of the rubber would cause it to squeeze out laterally under pressure as the jaws of the clamp were moved toward each other. However, the fabric wrapper is also engaged by the jaws of the clamp, and being of an inelastic nature resists the spreading out of the rubber at the sides of the tube. By thus confining this rubber at the sides of the tube a pressure is applied thereto. This enables a perfect splice to be obtained, since it will be apparent that all parts of the joint are subjected to pressure while clamped between the jaws, this pressure being due either to the direct clamping action of the jaws or to the confining of the rubber at the sides of the tube by the inelastic wrapping.

After the sulphur chloride solution has set, the fabric wrapper 7 is removed and the tube pulled apart to straighten out the fold 4, thereby leaving the finished joint, as indicated by Fig. 7. The joint or amount of overlap may be of any required length, although it has been found that the splice produced by this process is so perfect that a shorter splice can be used than has heretofore been thought necessary. A 1½ inch splice has been found to give just as good a joint as the old 3 inch splice, and this results in a saving of 3 inches of material on each tube.

As before premised, the clamp arrangement or construction may be of any desirable character, but it is well to indicate that in the carrying out of my invention the clamp devices are cast in gangs of three or more so that when the third tube has been inserted into the device the first one is ready to come out, since I have found that the time of two minutes is sufficient for the pressure to become effective. This, therefore, permits an endless cycle of the operation to be carried out.

While I have shown and described one manner of carrying out the process of splicing rubber tubes for the purpose of illustrating the invention, it will be obvious that variations and modifications are possible without departing in any manner from the spirit of the invention.

Having thus described my invention, what I claim as new and desire to secure by Letters Patent is:—

1. The method of splicing the ends of rubber tubes, which comprises bringing the properly treated ends together, applying an inelastic wrapper thereto, and clamping the ends between opposed jaws with the inelastic wrapper still in position thereon.

2. The method of splicing the ends of rubber tubes, which comprises telescoping the properly treated ends, applying an inelastic wrapper thereto, and clamping the over-lapping ends between opposed jaws with the inelastic wrapper still in position.

3. The method of splicing the ends of rubber tubes, which consists of folding the respective ends and bringing them into juxtaposition in their tubular form, simultaneously applying a splicing compound to the ends, bringing one treated end over the other treated end, and applying pressure to the treated ends.

4. The method of splicing the ends of rubber tubes, which comprises folding both of the tube ends and bringing the tube ends together, a folded portion of one tube end serving to receive and position the other tube end, simultaneously applying a splicing compound to the tube ends, bringing one treated end over the other treated end in an overlapping relation, and applying pressure to the said overlapping ends.

5. The method of splicing the ends of rubber tubes, which comprises folding back both of the ends and returning the edge of one of the folded back portions, telescoping the other end on the said end with the re-turned edge, simultaneously applying a splicing composition to the re-turned edge of one end and the folded back portion of the other end, forcing the said folded back portion over the re-turned edge in an overlapping engagement therewith, and applying pressure to the overlapping portions.

6. The method of splicing the ends of rubber tubes, which comprises folding back the ends and re-turning the edge of the one of the folded back portions, bringing the ends together and simultaneously applying the splicing composition to the re-turned edge of one end and the folded back portion of the other end, forcing the said folded back portion over the re-turned edge, wrapping the joint with inelastic material, and clamping the joint between opposed jaws with the inelastic wrapper still in position thereon.

7. The method of splicing the ends of rubber tubes, which comprises properly treating and telescoping the ends, and clamping the ends between opposed jaws with provision for restricting the lateral spreading of the rubber under the pressure of the jaws.

8. The method of splicing the ends of rubber tubes which comprises folding one end of the tube to provide a coating compound receiving portion, folding the other end of the tube in such manner as to provide a neck portion and a coating compound receiving portion, telescoping the first-mentioned folded end upon the neck portion of the second-mentioned folded end, simultaneously applying a splicing compound to the splicing compound receiving portions of both ends, bringing the folded and treated portion of the first-mentioned end over the treated portion of the second-mentioned end in overlapping relation and applying pressure to said overlapping portions.

In testimony whereof I affix my signature.

WALTHER H. GROTE.